United States Patent
Brockenborough et al.

[11] Patent Number: 5,991,647
[45] Date of Patent: Nov. 23, 1999

[54] THERMALLY SHIELDED SUPERCONDUCTOR CURRENT LEAD

[75] Inventors: William E. Brockenborough, Brighton; Bruce Barton Gamble, Wellesley; Anthony J. Rodenbush, Marlboro; Ahmed Sidi-Yekhlef, Framingham, all of Mass.

[73] Assignee: American Superconductor Corporation, Westborough, Mass.

[21] Appl. No.: 08/681,840

[22] Filed: Jul. 29, 1996

[51] Int. Cl.⁶ .............................. H01L 39/00; H01B 12/00
[52] U.S. Cl. .................. 505/163; 335/216; 174/15.4; 62/51.1; 62/54.1; 505/888; 505/894; 428/34.1; 428/930
[58] Field of Search .................. 428/34.1, 930; 505/163, 885, 888, 894; 335/216; 62/54.1, 51.1; 174/15.4, 17 R, 17 GF, 17 VA, 18

[56] References Cited

U.S. PATENT DOCUMENTS

| | | | |
|---|---|---|---|
| 4,134,037 | 1/1979 | Berthet et al. | 310/52 |
| 4,164,671 | 8/1979 | Gamble | 310/52 |
| 4,600,802 | 7/1986 | Ihas et al. | 174/15 |
| 4,635,450 | 1/1987 | Laskaris | 62/514 R |
| 4,895,831 | 1/1990 | Laskaris | 505/1 |
| 5,166,776 | 11/1992 | Dederer et al. | 62/51.1 |
| 5,260,266 | 11/1993 | Herd et al. | 505/1 |
| 5,347,251 | 9/1994 | Arrendale | 335/216 |
| 5,353,000 | 10/1994 | Morris et al. | 335/216 |
| 5,369,387 | 11/1994 | Woods et al. | 335/216 |
| 5,376,755 | 12/1994 | Negm et al. | 505/231 |
| 5,426,094 | 6/1995 | Hull et al. | 174/125.1 |
| 5,590,536 | 1/1997 | Wu | 62/51.1 |
| 5,657,634 | 8/1997 | Woods | 62/51.1 |

FOREIGN PATENT DOCUMENTS 0 482 840 A1   4/1992   European Pat. Off. .

OTHER PUBLICATIONS

PCT/US97/12897, Search report mailed Dec. 23, 1997.

*Primary Examiner*—Marie Yamnitzky
*Attorney, Agent, or Firm*—Fish & Richardson P.C.

[57] ABSTRACT

A high temperature superconductor lead assembly for reducing the heat leak into a cryocooled system features a shroud configured for at least partial submersion in a cryogenic fluid contained within a bath chamber, and a high temperature superconductor lead element at least partially contained within the shroud. In use, a portion of the high temperature superconductor lead element contained within the shroud extends below a fluid level of the cryogenic fluid in the bath chamber. The portion of the high temperature superconductor lead element is thermally shielded by the shroud such that it is maintained at a temperature higher than the temperature of the cryogenic fluid. The shroud is a double-walled vacuum structure with a sealed end and an open end. In use, the open end is submerged in the cryogenic fluid.

9 Claims, 1 Drawing Sheet

THERMALLY SHIELDED SUPERCONDUCTOR CURRENT LEAD

BACKGROUND OF THE INVENTION

The invention relates to high temperature superconductor current leads, and particularly to high temperature superconductor leads for carrying current to a device housed in a stratified fluid cryogenic system.

A major source of heat escaping into a cryogenic system typically occurs at the connection of the cryogenic system to the outside world. When the cryogenic system houses an operative superconducting device immersed in a cryogenic fluid, the "connection" is typically through the current leads, through which electrical energy passes to and from the device. The escape of heat through this connection is often referred to as "heat leak".

The chief mechanism of heat leak in a high temperature superconductor (HTS) current lead is generally conduction from the current lead to the cryogenic fluid. This is particularly true of leads made from composite high temperature superconductors. The rate of heat leak W of the superconductor lead can be approximated for design purposes as a function of thermal conductivity (k) averaged over the thermal length of the lead, cross-sectional area (A), temperature change ($\Delta T$) between the warm end HTS temperature and the cold end cryogenic fluid temperature, and thermal length (L) spanning the two temperatures, as described by the following relation:

$$W \approx kA\Delta T/L$$

As used herein, "thermal length" means the lead length over which the temperature gradient occurs, which can be less than the physical length of the lead. Heat leak from an HTS current lead can thus be reduced by decreasing k, A, and $\Delta T$, and by increasing L.

SUMMARY OF THE INVENTION

The invention relates to a high temperature superconductor lead assembly which reduces the heat leak into a liquid cryogen cooled system. The lead assembly features a shroud configured for at least partial submersion in a cryogenic fluid contained within a bath chamber, and a high temperature superconductor lead element at least partially contained within the shroud. In use, a portion of the high temperature superconductor lead element contained within the shroud extends below a fluid level of the cryogenic fluid in the bath chamber. This portion of the high temperature superconductor lead element is thermally shielded by the shroud such that it is maintained at a temperature higher than the temperature of the cryogenic fluid.

In particular embodiments of the invention, the shroud is a tube having a sealed end and an open end, wherein, in use, the open end is submerged in the cryogenic fluid. The sealed end may include an aperture for allowing leakage of cryogenic fluid, typically as a gas, out of the shroud. The shroud is a double-walled structure defining a closed insulation space therebetween, which, in use, limits heat conduction from the high temperature superconductor lead to the cryogenic fluid outside the shroud. A fitting defines an inlet in communication with the insulation space for facilitating drawing a vacuum in the insulation space. An insulating powder or a foam can be located in the insulation space.

In a preferred embodiment, the shroud can be metallic or can include a lead for connection to a liquid cryogen cooled device; and thereby the shroud can act as an electrical by-pass of the high temperature superconductor lead.

According to another aspect of the invention, a high temperature superconductor current lead assembly features a thermally shielding shroud having a lead axis extending from a proximal closed end thereof to a distal open end, and defining a shroud chamber. The shroud configuration substantially prevents a cryogenic liquid from entering the chamber. A high temperature superconductor lead element is at least partially contained within the shroud chamber.

According to another aspect of the invention, a liquid cryogen cooled system features a dewar vessel defining a bath chamber for containing a cryogenic fluid, a high temperature superconductor current lead assembly of the invention, a device located within the bath chamber for submersion in the cryogenic fluid, and a connection electrically connecting the high temperature superconductor current lead assembly to the device.

According to another aspect of the invention, a method of decreasing heat leak from a high temperature superconductor current lead element used in a liquid cryogen cooled system features placing the high temperature superconductor current lead element in electrical connection with a liquid cryogen cooled device, and increasing a thermal length of the high temperature superconductor current lead element without increasing the distance between a surface of the liquid cryogen and a warm terminal end of the high temperature superconductor current lead element.

In particular embodiments of this aspect of the invention, the high temperature superconductor current lead element is extended into the liquid cryogen and enclosed in a shroud which thermally shields the high temperature current lead element from the liquid cryogen, thereby increasing the thermal length of the current lead element. In one embodiment, cryogenic fluid can be controllably leaked, typically as a gas, out of the shroud through an aperture at the closed end.

According to another aspect of the invention, a method of extending the thermal length of a high temperature superconductor current lead element features positioning the high temperature superconductor current lead element within a shroud having an open end and a closed end and defining a chamber, and submerging the open end of the shroud into a liquid cryogen contained within a bath chamber with the high temperature superconductor current lead element extending below a surface level of the liquid cryogen in the bath chamber. The submersion substantially prevents the liquid cryogen from entering the chamber.

BRIEF DESCRIPTION OF THE DRAWINGS

Other objects, features and advantages of the invention will be apparent from the following description taken together with the drawings in which.

DESCRIPTION OF THE PREFERRED EMBODIMENT

Figure 1:
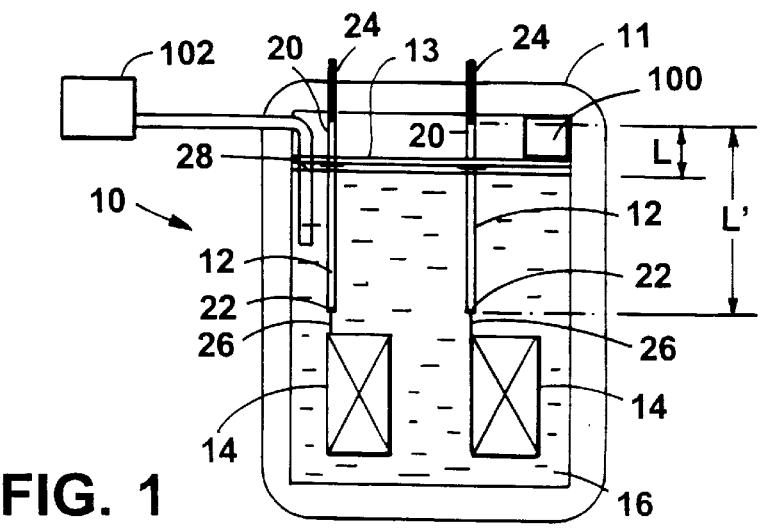
FIG. 1 is a diagrammatic representation of a liquid cryogen cooled system, according to the invention.

Referring to FIG. 1, a liquid cryogen cooled system 10, for example, a superconducting magnetic energy storage system (SMES) which provides power when there is a sag in the power available on a utility line, includes a dewar vessel 11 bath chamber low heat-leak, high temperature superconductor (HTS) current lead assemblies 12, intermediate heat station 13, and magnet 14. In addition to magnet 14, the HTS current lead assembly of the invention is applicable to other cryocooled devices, such as a cryocooled MOSFET assembly, a cooled power device, or a superconducting cable. Magnet 14 is cooled in a cryogen bath 16, for example, any stratified fluid cryogen system such as a liquid helium bath at 4.2K, a liquid nitrogen bath, a liquid hydrogen bath, or a liquid neon bath. System 10 generally includes either an internal cryocooler 100 or an external liquefier 102 for condensing cryogenic fluid that has boiled off.

Current leads 12 include warm ends 20 and cold ends 22. Warm ends 20 terminate in a lead 24, for example, a copper lead surrounded by an electrically insulating tube, connected to a current source (not shown) and to a cryocooler (not shown). The cryocooler generally holds the warm ends 20 of current leads 12 at about 60K. Cold ends 22 include low temperature superconducting braid 26 connected to magnet 14.

The available thermal length (L) has conventionally been limited by the distance between intermediate heat station 13 and the surface 28 of cryogen bath 16. The intermediate heat station maintains the top of the dewar at a higher temperature than the bottom of the dewar, and may be either actively or passively cooled. In applications such as SMES systems, it is generally desirable to have a large stock of cryogen over the magnet to allow operation for a long period of time in the event proper cryocooler 100 or liquefier 102 operation is interrupted. Additionally, the equipment is usually located indoors or in a truck trailer limiting the height of the dewar vessel.

Figure 2:
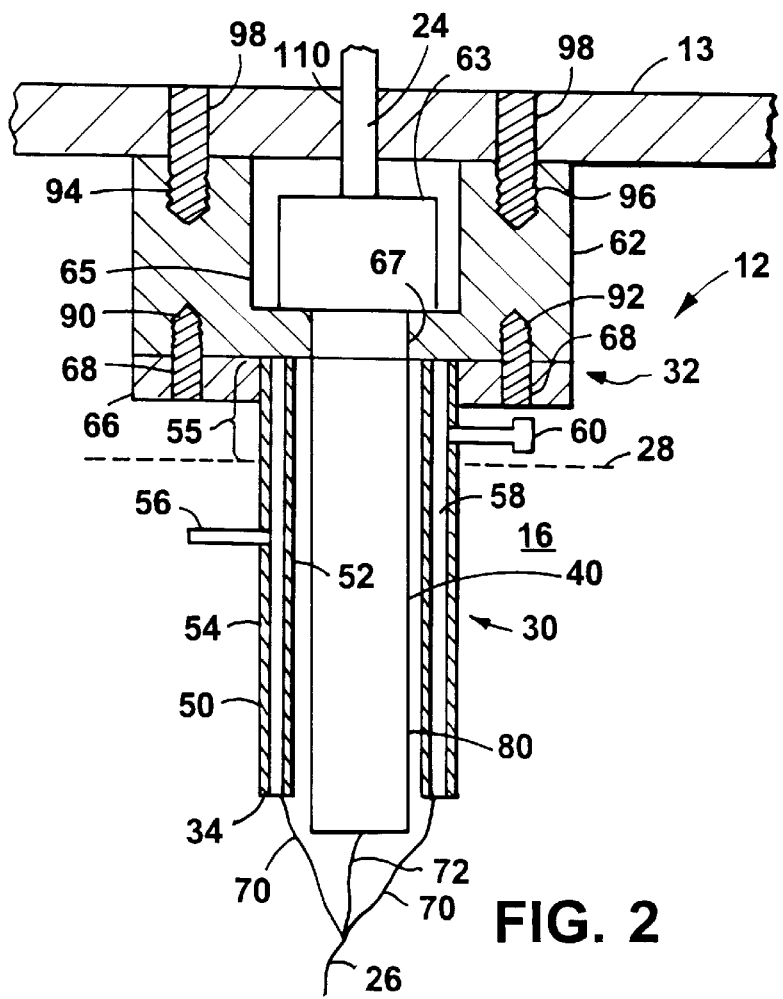
FIG. 2 is a cross-sectional side view of a high temperature superconductor current lead assembly of the invention.

Referring to FIG. 2, to increase the thermal length of lead 12, a tube 30 that is closed at the top 32 and open at the bottom 34 shrouds an HTS lead element 40. Tube 30 acts to thermally shield lead element 40 from the cryogen bath 16 by keeping the lead element dry, analogous to how an empty glass placed upside down in a tub of water remains dry inside. This process and structure increases the thermal length of lead 12 to L' (see FIG. 1), the length L' corresponding to the Length of the dry lead.

To limit heat conduction by radiation from lead element 40 outward to cryogen bath 16, and thus limit undesirable evaporation of the contained liquid cryogen, tube 30 is in the form of a vacuum vessel or shroud 50 having an inner wall 52 and an outer wall 54. Shroud 50 is preferably constructed from a material having low thermal conductivity, for example, stainless steel. Low thermal conductivity is particularly important in a section 55 of outer wall 54 because of its short thermal length.

A tube 56 provides access to the space 58 between inner and outer walls 52, 54. A vacuum can be pulled in space 58 by pumping through tube 56; the tube is then pinched closed to seal off space 58 from the exterior environment. A burst disk 60 provides a controlled rupture of shroud 50 if liquid cryogen leaks into space 58 and boils. Burst disk 60 can be positioned above the level of liquid cryogen, as shown, or, alternatively, below the level of liquid cryogen. Space 58 can alternatively be filled with an insulation powder, for example, perlite, colloidal silica, or silica aerogel, a foam, for example, polystyrene or polyurethane, or multi-layer insulation.

Top end 32 of lead 12 is closed with a heat sink such as block 62 formed from a conductive material, for example, copper. Block 62 defines threaded holes 90, 92, 94, and 96. Any of the well-known heat sink approaches may be used.

A flange 66 connected to shroud 50, for example, by brazing, includes through bores 68 corresponding to threaded holes 90 and 92 for mounting of shroud 50 to block 62 with bolts (not shown). Dewar vessel 11 includes through bores 98 for mounting of block 62 to the dewar vessel by bolts (not shown) and a through bore 110 for passage of warm end lead 24 therethrough. Block 62 is sealed to lead element 40 by solder 67. A cap 63 formed from a conductive material, for example, copper, is located within an opening 65 in block 62. Warm end lead 24 is soldered to cap 63. Block 62 and cap 63 together provide the current path from warm end lead 24 to lead element 40 and shroud 50. Block 62 is electrically insulated from dewar vessel 11, by, for example, an insulating gasket.

Cold end braid 26 includes leads 70 attached to shroud 50 and a lead 72 attached to HTS lead element 40. Leads 70 are preferably superconducting or copper, but may be made from other metals. Through leads 70, shroud 50 can act as an electrical bypass in case the electrical continuity of lead element 40 is broken.

HTS lead element 40 remains dry as long as top end 32 of lead 12 does not leak, although slight leakage in the system can be accommodated because liquid surrounding HTS lead element 40 is boiled off by the heat conducted down the lead element. Leakage up to a level which can be offset by the convected heat may be deliberately designed into the system in order to provide additional vapor cooling for the lead.

Figure 3:
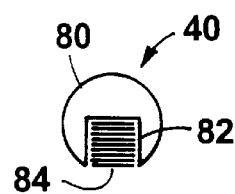
FIG. 3 is a cross-sectional end view of a superconductor lead element of the high temperature superconductor current lead assembly of FIG. 2.

Referring to FIG. 3, HTS lead element 40 in accordance with the illustrated embodiment of the invention, includes a support 80 formed from, for example, a material that is a good electrical and thermal insulator such as a fiberglass epoxy composite tubing. G10 tubing, manufactured as Garolite by Spaulding Composites, Rochester, N.H., is a suitable material. The electrical connection between lead element 40 and cap 62 is made by soldering the components together. Support 80 defines a channel 82 in which are located a stack of superconducting tapes 84 which act as the conductive path from cap 62 to braid 26.

For example, superconducting ceramics of the oxide, sulfide, selenide, telluride, nitride, boron carbide or oxycarbonate types, in a supporting matrix, can be used as tapes 84. Superconducting oxides are preferred, for example, members of the rare earth (RBCO) family of oxide superconductors, the bismuth (BSCCO) family of oxide superconductors, the thallium (TBCCO) family of oxide superconductors, or the mercury (HBCCO) family of oxide superconductors can be used. Flexible ceramics and metals, particularly silver and other noble metals can be used for the matrix supporting or binding the superconducting ceramic. Alloys substantially comprising noble metals, including oxide dispersion strengthened (ODS) silver, such as $Al_2O_3$—Ag, are often preferred. By "noble" are meant metals which are substantially non-reactive with respect to superconducting ceramics and precursors and to the gases required to form them under the expected conditions (temperature, pressure, atmosphere) of manufacture and use. Preferred noble metals include silver (Ag), gold (Au), platinum (Pt) and palladium (Pd). A Au/Ag alloy matrix in the range of 1 to 15 atomic percent, preferably 3 atomic percent, is the most preferred matrix.

To further increase the working time of low temperature superconducting magnet system 10, an internal cryocooler (not shown) or an external liquefier (not shown) can be used to recondense boiled off liquid cryogen.

Other methods of increasing the thermal length of a superconductor lead include forming a superconductor lead element in the shape of a spiral or in a wavy configuration to increase the length of the superconductor that is above the surface of the liquid cryogen.

The HTS current lead of the invention can also be used in other superconductor applications including other magnet applications such as magnetic resonance imaging machines, magnetic separation, and nuclear magnetic resonance machines.

Additions, subtractions and other modifications of the illustrated embodiments of the invention will be apparent to those practiced in the art and are within the scope of the following claims.

What is claimed is:

1. A superconductor current lead assembly, comprising:
    a tube having a sealed end and an open end, in use said open end of said tube being at least partially submerged in a cryogenic liquid contained within a bath chamber,
    a superconductor lead element at least partially contained within said tube, in use a portion of said superconductor lead element contained within said tube extends below a liquid level of the cryogenic liquid in the bath chamber, and
    an outer member surrounding said tube to form a double-walled shroud defining a closed insulation space therebetween, which, in use, limits heat conduction from said superconductor lead element to cryogenic fluid outside the shroud,
    said tube being sealed other than at said open end such that cryogenic liquid is substantially prevented from entering said tube, such that said tube thermally shields said superconductor lead element such that in use said portion of said superconductor lead element is maintained at a temperature higher than a temperature of the cryogenic liquid, said sealed end preventing leakage of cryogenic fluid out of said sealed end.

2. The superconductor current lead assembly of claim 1 further including a fitting defining an inlet in communication with said insulation space, said fitting for facilitating drawing a vacuum in said insulation space.

3. The superconductor current lead assembly of claim 1 further including a multi-layer insulation located in said insulation space.

4. A superconductor current lead assembly, comprising:
    a tube having a sealed end and an open end, in use said open end of said tube being at least partially submerged in a cryogenic liquid contained within a bath chamber, and
    a superconductor lead element at least partially contained within said tube, in use a portion of said superconductor lead element contained within said tube extends below a liquid level of the cryogenic liquid in the bath chamber,
    said tube being sealed other than at said open end such that cryogenic liquid is substantially prevented from entering said tube, such that said tube thermally shields said superconductor lead element such that in use said portion of said superconductor lead element is maintained at a temperature higher than a temperature of the cryogenic liquid, said sealed end preventing leakage of cryogenic fluid out of said sealed end,
    said tube including a connector for connection to a device submerged in said cryogenic liquid, said tube acting as an electrical by-pass of said superconductor lead element upon failure of said superconductor lead element.

5. A system cooled by a stratified liquid cryogen system, comprising:
    a dewar vessel defining a bath chamber for containing a cryogenic fluid,
    a superconductor current lead assembly including a tube having a sealed end and an open end, said open end of said tube in use being at least partially submerged in the cryogenic fluid, and a superconductor lead element at least partially contained within said tube such that in use a superconducting portion of said superconductor lead element contained within said tube extends below a fluid level of the cryogenic fluid in the bath chamber,
    said tube being sealed other than at said open end such that cryogenic fluid is substantially prevented from entering said tube, such that said tube thermally shields said superconductor lead element such that in use said portion of said superconductor lead element is maintained at a temperature higher than a temperature of said cryogenic fluid,
    a device located within said bath chamber for submersion in the cryogenic fluid, and
    a connection electrically connecting said high temperature superconductor current lead assembly to said device.

6. A superconductor current lead assembly, comprising:
    a shroud including a double-walled structure defining a closed insulation space therebetween, and
    a superconductor lead element at least partially contained within said shroud such that in use a portion of said superconductor lead element contained within said shroud extends below a fluid level of a cryogenic fluid contained within a bath chamber,
    said shroud thermally shielding said superconductor lead element such that in use said portion of said superconductor lead element is maintained at a temperature higher than a temperature of the cryogenic fluid, and said shroud limits heat conduction from said superconductor lead to the cryogenic fluid outside the shroud.

7. The superconductor current lead assembly of claim 6 further including a fitting defining an inlet in communication with said insulation space, said fitting for facilitating drawing a vacuum in said insulation space.

8. The superconductor current lead assembly of claim 6 further including a multi-layer insulation located in said insulation space.

9. A superconductor current lead assembly, comprising:
    a shroud including a connector for connection to a device submerged in a cryogenic fluid contained within a bath chamber, and
    a superconductor lead element at least partially contained within said shroud such that in use a portion of said superconductor lead element contained within said shroud extends below a fluid level of the cryogenic fluid in the bath chamber,
    said shroud acting as an electrical by-pass of said superconductor lead element upon failure of said superconductor lead element, said shroud further acting to thermally shield said superconductor lead element such that in use said portion of said superconductor lead element is maintained at a temperature higher than a temperature of the cryogenic fluid.

\* \* \* \* \*